(12) United States Patent
Todd et al.

(10) Patent No.: US 6,359,901 B1
(45) Date of Patent: Mar. 19, 2002

(54) METHOD AND APPARATUS FOR ASYNCHRONOUS ADAPTIVE PROTOCOL LAYER TUNING

(75) Inventors: Charlene Jean Todd, Chandler; Jeffrey Scott Churprun, Scottsdale; Byron L. Tarver; Chad Scott Bergstrom, both of Chandler, all of AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/145,805

(22) Filed: Sep. 2, 1998

(51) Int. Cl.$^7$ .................................................. H04J 3/16
(52) U.S. Cl. ................................................ 370/465
(58) Field of Search ................................ 370/400, 401, 370/311, 389, 390, 392, 252, 254, 241, 465, 474, 470, 468, 467, 395, 403, 229; 455/4.1, 4.2, 6.11

(56) References Cited

U.S. PATENT DOCUMENTS

| | | |
|---|---|---|
| 5,374,932 A | * 12/1994 | Wyschogrod et al. ....... 342/455 |
| 5,570,411 A | 10/1996 | Sicher |
| 5,701,294 A | 12/1997 | Ward et al. |
| 5,991,308 A | * 11/1999 | Fuhrmann et al. .......... 370/474 |

FOREIGN PATENT DOCUMENTS

| | | |
|---|---|---|
| EP | 0709982 | 10/1994 |
| EP | 0831669 | 3/1998 |

\* cited by examiner

*Primary Examiner*—Dang Ton
(74) *Attorney, Agent, or Firm*—Jenner & Block, LLC

(57) ABSTRACT

An apparatus is disclosed for continuous load optimization of wireless communication networks by making use of statistical data about both the communication medium characteristics and the characteristics of messages that users desire to send over the network. The network comprises a network control base station (20) and a plurality of slave stations (22). One or more applications (72, 104) are associated with each station which are used to generate the messages in digital format. Each application is coupled to a protocol stack (88) that defines the required characteristics of the data and changes to the data that occur during the communication process. An interface (90) is coupled to the layers of each protocol stack (88) to allow tuning of the message characteristics to maximize successful transmission with minimum message latency.

20 Claims, 6 Drawing Sheets

-PRIOR ART-

METHOD AND APPARATUS FOR ASYNCHRONOUS ADAPTIVE PROTOCOL LAYER TUNING

FIELD OF THE INVENTION

This invention relates in general to the field of wireless communication networks and in particular to a method for continuous load optimization of wireless communication networks by making use of statistical data about both the communication medium characteristics and the characteristics of the messages that applications desire to send over the medium.

BACKGROUND OF THE INVENTION

Prior art has established the use of protocols to control the transfer of data over a communication medium. The protocols define the required characteristics of the data and changes to the data that occur during the communication process. The use of protocols allows interoperability among diverse systems by adherence to these recognized Standards. An architecture comprising a hierarchy of related protocol standards is often envisioned as a layered protocol stack as shown in FIG. 1. The application layer 10 is the generator of the data which a user desires to transmit over the network to a user at another network node. The application may receive inputs in the form of audio or video signals, text, or digital data, and then converts these inputs into packets of digital data in a form acceptable by the next layer and as defined by the application layer protocol. The transport layer 12 and the network layer 14 usually conform to widely known standardized protocols, with the Standard Internet Transmission Control Protocol (TCP) and the Standard Internet Protocol (IP) being examples used in wireline networks. The transport layer 12 is often responsible for dividing messages into segments compatible with the network, and also performs functions associated with reliable delivery of data, including packet retransmission requests. The network layer 14 performs functions that control the passing of data through the network, such as routing. The datalink layer 16 establishes characteristics of the various nodes which make up the network and the communication medium that interconnects them. This layer synchronizes transmission, and is often responsible for error-control on a frame basis and for node address handling. For example, when the destination address of a frame matches the address of the current node, the datalink layer 16 forwards the frame up the protocol stack. The physical layer 18 protocol defines the required characteristics of the hardware used at the various nodes in the network to implement the protocols. Different physical layer protocols are used for different media, such as fiber, coaxial cable, or wireless. The physical layer 18 describes how data bits are encoded into the various types of media signals and further describes the channel interface.

The prior art architecture for the design of a network requires that each layer of the protocol stack only communicate with the adjacent layers in the stack, thus forming an open loop system. Only limited information about the communications characteristics of the lower layers are passed to the higher layers. In this open loop architecture, the application layer may blindly construct packets of data for transmission without regard to the likelihood that these packets will be received in a timely and reliable manner at the destination node. This architecture works in an acceptable manner when the datalink medium is based on wireline technology, and increases in the number of messages that must be passed over the network can be accommodated by adding more wireline channels.

When the prior art layered protocol stack architecture is applied to wireless communication networks with the inherent limitations of finite datalink bandwidth, channel fading, interference and background noise, then various means must be used to limit the number of inputs to the system to that which can be conveyed across the network with reasonable worse case network access delay. In a wireless application incorporating a high demand, limited bandwidth network, the use of traditional layered, open loop, architectures can lead to unresolved growth in message latency and, in the extreme case, network collapse. One approach is to establish message priority schemes where different users have different levels of priority. When a high priority user wishes to use the network, lower priority users are directed to vacate the network. Message priority is added as a preamble to each high priority message.

Another variation of the prior art architecture for wireless communications is similar to that used in wireline systems and is based on obtaining sufficient datalink bandwidth to assure that the worse case network access delay is never exceeded for all users assigned to the network. An alternative is to force all users to produce messages at a fixed rate slower than that which would result in the worse case maximum network access delay. These approaches are very inefficient and waste some of the allocated bandwidth since the worse case network access delay rarely occurs. In order to avoid unstable conditions and improve performance over prior art approaches, network performance information must be provided to other layers in order to optimize, or tune, network performance. Statistical data, or metrics, can be passed up and down the existing layered protocol stack architecture; however, this introduces significant delay and processing due to encapsulation and decapsulation of messages as they are passed from layer to layer, and further requires undesirable modifications to intervening layer protocol structures.

Hence, what is needed is an improved method of feedback and statistical measurement mechanisms that allow, in an asynchronous manner, various layers of the protocol stack to make informed decisions regarding the transfer of data to make optimum use of the network resources. Also needed are noninvasive methods and apparatus that prevent unrestrained growth in channel access delay, and preserve the quality of service (QOS) provided to multiple applications. What is further needed are methods either for centralized or distributed network control of protocol layer parameters. Also, what is needed are methods and apparatus to provide network performance information to multiple applications while minimizing or not requiring modifications to intervening layer protocols; such as, for example, the transport and network layers which are well-defined commercial protocols. What is additionally needed are methods and apparatus for interfacing to high and low-level protocol layers; for example, the application layer and the dataLink layer, in order to extract and forward network performance information in real time.

BRIEF DESCRIPTION OF THE DRAWINGS

A more complete understanding of the present invention may be derived by reference to the detailed description and the claims when considered in connection with the accompanying drawings in which like reference numbers represent similar parts, and wherein:

Accordingly, the present invention provides a new and improved method for continuous load optimization of wireless communication networks by making use of statistical data about both the communication medium characteristics and the characteristics of the messages that applications desire to send over the medium. It is an advantage of the present invention that existing and future application software developed for the mass wireline market can be adapted for use in wireless communications systems by minimal modification to this application software by adding an interface to the software to allow optimization of its performance. It is a further advantage of the present invention that existing software developed for wireline datalink standardized protocols can be used for wireless communications with minimal modification by adding an interface to other elements of the present invention. It is also an advantage of the present invention that bandwidth and QOS optimization is achieved without modifications to well-established commercial protocols for transport and network layers. It is a further advantage of the present invention that the worse case network access delay is minimized in a band limited wireless communications network for users who desire to transmit messages of varying length and complexity. It is still another advantage of the present invention that network performance information can be exchanged between the application and datalink layers in real time without invoking intervening layers of the protocol stack.

Figure 1:
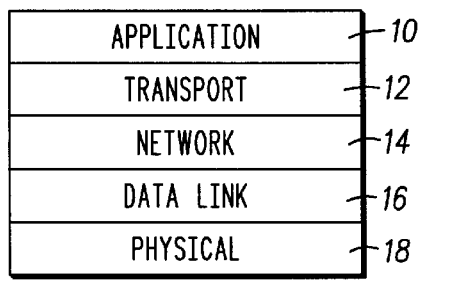
FIG. 1 depicts an architecture comprising a hierarchy of related protocol standards in the form of a layered protocol stack as defined in prior art.
Figure 2:
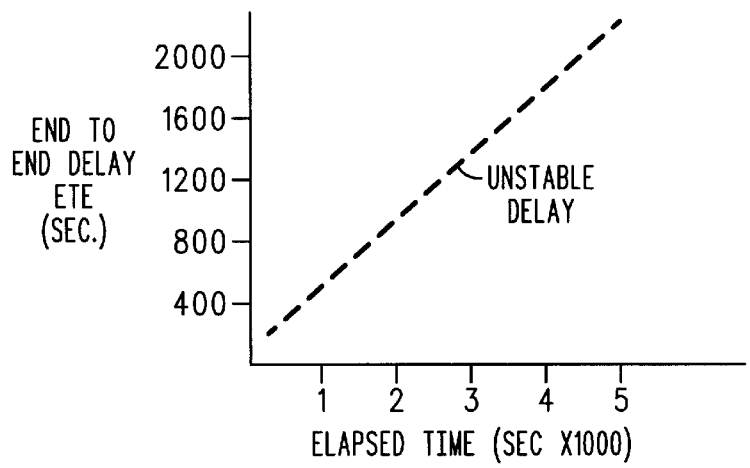
FIG. 2 illustrates the unresolved growth in end to end delay of sending a message across the network without the advantages of the present invention.
Figure 3:
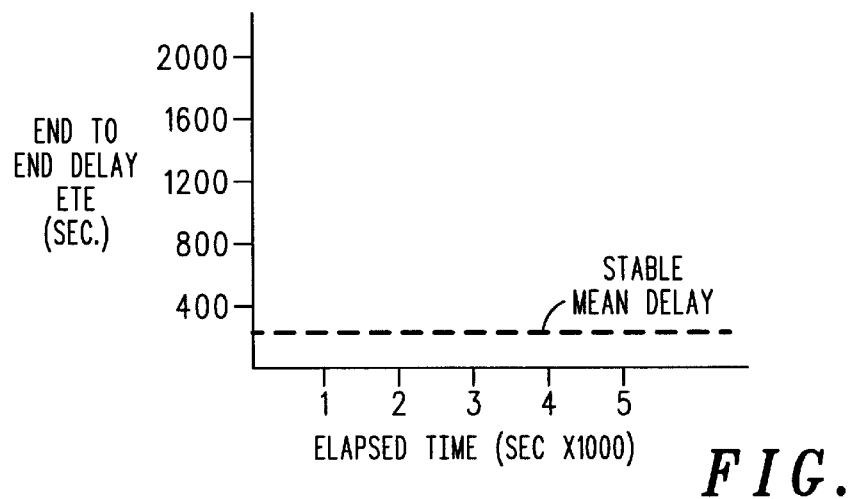
FIG. 3 illustrates the stable end to end delay of message transmission provided by the present invention.

FIG. 2 and FIG. 3 are data obtained from computer based simulations of the network performance under various conditions. FIG. 2 illustrates the delay experienced by the network under heavy load conditions, with all nodes generating packets at a fixed, predetermined rate, and in the absence of the network performance feedback embodied in the present invention. As the x-axis elapsed time increases, the end-to-end (ETE) delay increases dramatically, eventually resulting in loss of packets as queue buffers overflow and in possible network collapse. FIG. 3 illustrates the improved delay characteristic obtained using the present invention. The ETE delay remains at a stable, fixed level as each of the transmitting node applications receives delay information and controls their message generation rate in order to optimize. bandwidth usage. Under heavy network loads, feedback dramatically improves network throughput performance, yet does not adversely impact throughput in lightly loaded conditions.

Figure 4:
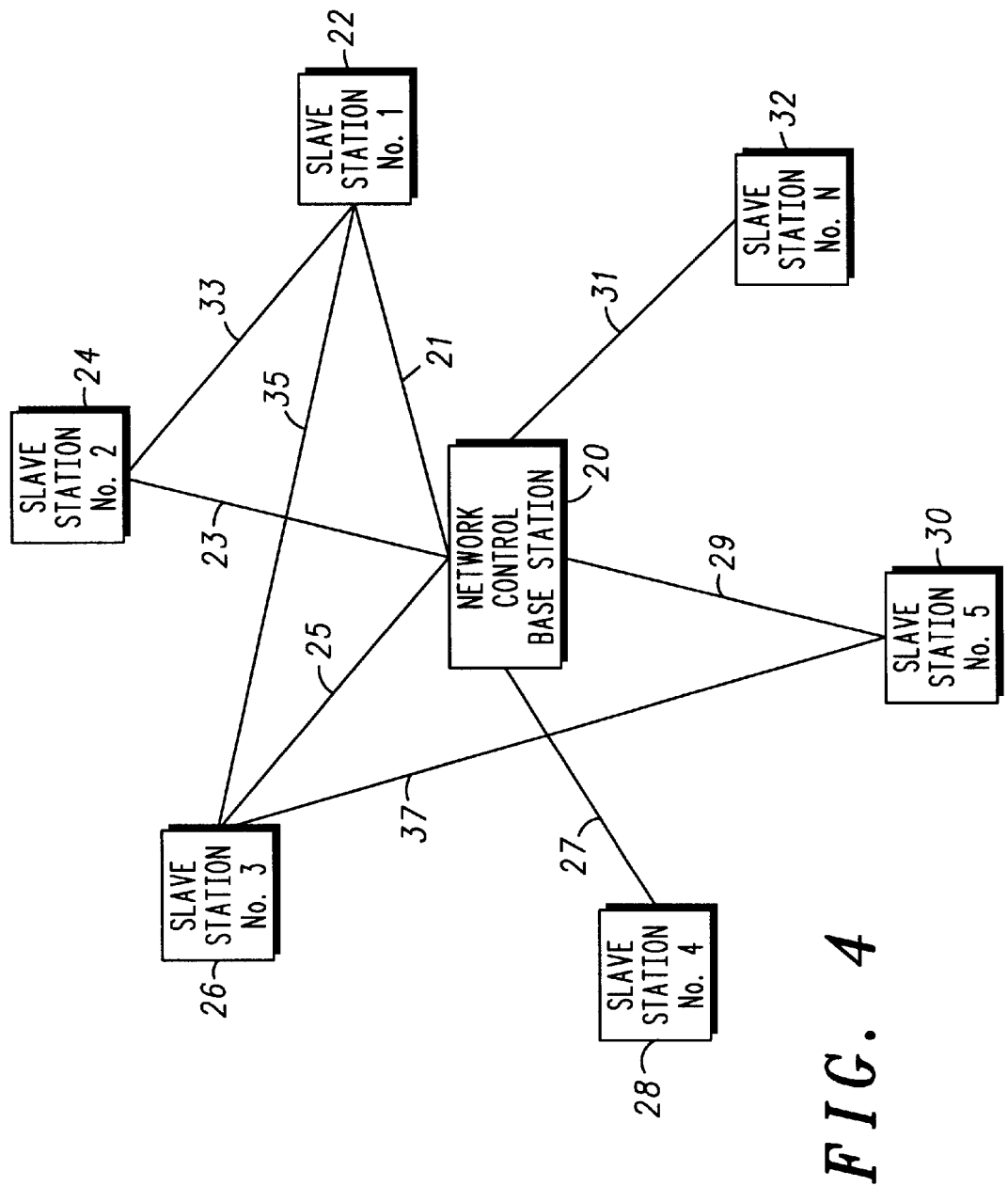
FIG. 4 depicts a wireless communications system comprising a network control base station and a plurality of slave stations connected by datalinks according to the preferred embodiment of the present invention.

The above and other advantages of the present invention, in its preferred embodiment, are provided by a wireless communications network as illustrated in block diagram form in FIG. 4. Major components include the network control base station 20, and a plurality of slave stations, or network nodes, identified as blocks 22, 24, 26, 28, 30 and 32, whereby slave station 32 represents the No station of a total of N slave stations. The network control base station 20 is physically located so that direct communication is possible to every slave station in the network, typically by placing the network control base station at a location of elevation or position advantage to allow line-of-sight transmission to all slave stations. The network is configured to allow all types of communication such as slave-to-base station, slave-to-slave, slave-to-base station-to-slave, base station-to-selected slave, and base station-to-all slaves broadcast communication. The base station-to-all slaves broadcast communication may contain a pilot or control channel which continuously broadcasts the status of the network and assigns network resources to the various slave stations.

Datalinks 21, 23, 25, 27, 29, and 31 represent typical wireless datalinks that may exist between the network control base station 20 and every slave station. Datalinks 33, 35, and 37 represent wireless datalinks that are possible between selected slave stations. The network structure assumes that it may not be possible to establish slave-to-slave datalinks directly between any one slave station and any other. The datalinks comprise a plurality of wireless communication channels with each channel being characterized by a succession of slots wherein packets of digital data can be communicated across the datalink. The datalinks may use frequency division multiple access, time division multiple access, or code division multiple access modulation schemes, as well as other similar modulation schemes, or any combination thereof, to allow access to the channel by the network nodes. Those skilled in the art will recognize that a network structure that uses other combinations of channel arrangement and access scheme fall within the scope of this invention.

One function of the network control base station 20 is to define the characteristics of the network that will apply to message traffic to be sent in the immediate future. These network characteristics are frequently modified as variations occur in the needs for communication of different types of data, the overall communication load, and the quality of signal propagation across the network. A slave station, for example the slave station 2 designated by block 24, will normally receive information about the network characteristics and its assigned transmission parameters by listening to the control channel which continuously broadcasts data about the present and near future configuration of the network. If a slave station is not receiving this information from the base station, it will recognize this condition and will enter a search mode to observe the activity on the network, determine the current state of network characteristics, and adjust its own parameters to achieve synchronization with the other nodes of the network.

The network control base station 20 includes computational means to evaluate the message traffic flow over the network, the propagation characteristics of the network, and the characteristics of messages generated by applications associated with both the slave stations and the network control base station. Each slave station provides, to the network control base station over its datalink, information about the messages that it has in its queue, including the number, priority, size, type, and minimum required transfer rate. From these data, the network control base station 20 determines appropriate adjustments to the network characteristics to uniformly distribute the communication load across the network, optimize the quality of service and minimize the network access delay time. The network control base station may make changes to the network access scheme, access priority, allowed transmission duration for each slave station, and allowed rate of transmission for each type of message. It also may make changes to the network center frequency, network bandwidth, waveforms to be used, slot structure, and type of forward error correction to be used. Information on the new state of the network and allowed access by each slave station is then broadcast by the network control base station 20 to the slave stations. If necessary, the network control base station can issue stop transmission commands in cases of long transmissions that are preventing higher priority traffic from using the network. The present invention includes in each slave station an interface with the protocol stack layers associated with each application. The interface may include connections to the transport and network layers of the protocol stack to allow adjustments in transmission rates, message received reply time-out limits, etc., to optimize these layers for use in a wireless network environment. The interface informs each application and its protocol stack about that station's network access priority and allowed transmission parameters. In response to the network control base station directives, the interface provides control of the application's rate of message generation, type of modulation and type of forward error correction to be used, as well as what part of the message is to be sent during each access to the network. Each application can then adjust its message characteristics and rate of message generation to stay within the allowed limits. This feedback control mechanism to the application layer of the protocol stack minimizes excessive build-up of messages in the station's queue and the requirement to retransmit messages which may have been interrupted in their transmission due to higher priority traffic, etc.

The network control base station 20 may alter the bandwidth of a channel or channels to optimize the load on the network. For example, a user with a large message may be provided with extra bandwidth to allow its transmission in a minimum amount of time. The channel bandwidth may be narrowed during the transmission of a large number of small messages, such as e-mail, when the narrow bandwidth is sufficient for timely transmission of this traffic.

The network control base station 20 may direct a slave station to take multiple messages from its queue and concatenate them into a single long message. Then the slave station is provided a sufficient amount of bandwidth, number of packet slots, etc., to transmit the entire message before releasing the channel. Each sub-message within the long message is required to have information within its header identifying the address of the message's destination. The sub-messages may be of different lengths, and have different types of modulation and forward error correction.

Figure 5:
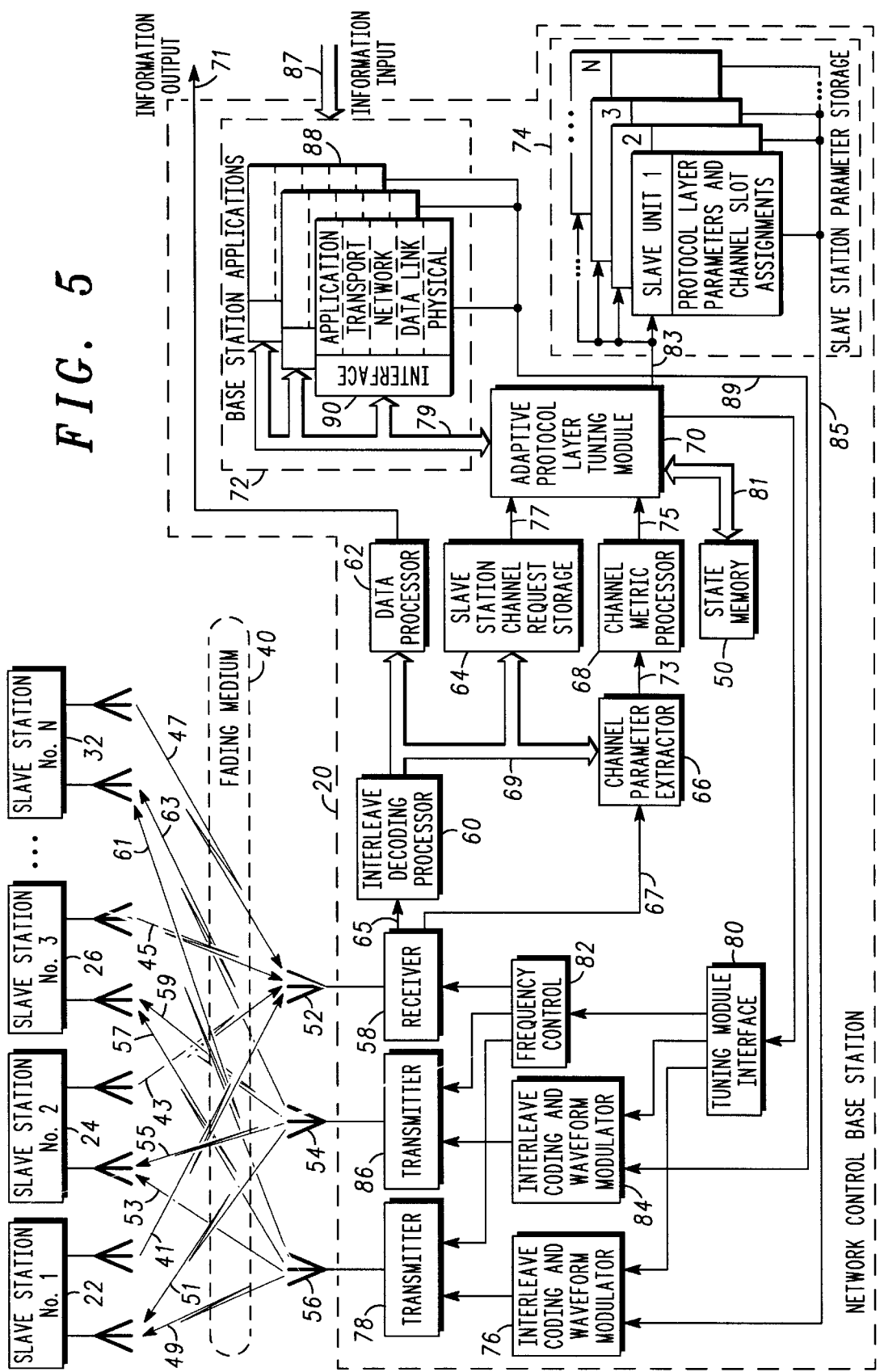
FIG. 5 shows a detailed block diagram of the network control base station and its interface to the slave stations.

The wireless network and details of the network control base station are illustrated in block diagram form in FIG. 5 in accordance with the preferred embodiment of the present invention. The slave stations 22, 24, 26, and 32 are coupled to the network control base station 20 through the fading medium 40 by way of receive paths 41, 43, 45 and 47, and by transmit paths 49, 51, 53, 55, 57, 59, 61 and 63. The fading medium 40 attenuates these signals by varying amounts due to the distance between transmit and receive points, and may corrupt the signals by the processes of multi-path fading, addition of man-made and natural noise, etc. Antennas 52, 54 and 56 provide the coupling of the network control base station to the fading medium 40 and thus to all the slave stations. Those skilled in the art will recognize that any alternate antenna arrangement, which may include transmit-receive switches, duplexers or similar devices may be used in place of antennas 52, 54 and 56, and thus fall within the scope of this invention. The slave stations transmit information as messages in the form of packets of digital data positioned in defined slots in a plurality of wireless communication channels, and may use frequency division multiple access, time division multiple access, or code division multiple access modulation schemes, as well as other similar modulation schemes, or any combination thereof. The signals received from the slave stations are collected by antenna 52 and supplied to receiver 58 wherein these signals are separated from noise and other unwanted interfering signals, amplified and demodulated to form the complex digital data stream 65. An amplified and band limited version of the received signals in the multiple channels is also supplied by receiver 58 as broadband output 67.

The interleave decoding processor 60 accepts the complex digital data stream 65 from receiver 58, performs necessary error correction and format conversion, and separates the complex data stream into multiple individual digital data streams 69 that comprise received versions of the messages which were transmitted by each of the slave stations. Some of these messages are directed to the network control base station 20 as their final destination, and thus the function of the data processor 62 is to extract these messages from the data streams 69 by recognizing the network control base station's address in the preamble of the message, perform any needed additional processing and format conversion, and supply the resulting output 71 to the intended user of the information. The output 71 may comprise audio, video, text or digital data.

The channel parameter extractor 66 accepts the broadband output 67 of receiver 58 and also samples the multiple individual digital data streams 69, and continuously performs various analyses of these data. The analyses may include conducting fast Fourier transforms or similar spectrum analyses, calculating signal to noise ratios, determining bit error rates, evaluating the incidence of fading, determining the characteristics of interference, whether wide band or narrow band, bauded or un-bauded, and identifying those channels in use and not in use. The channel parameter extractor 66 then combines this information about the current condition of the datalinks within the network into channel parameter data 73. The channel metric processor 68 uses both the current channel parameter data 73 and recently received channel parameter data stored in its internal memory to generate metric or statistical type information about the network that defines the transmission quality of each channel. The resulting network metrics data 75 includes a statistical history of signal to noise ratio, fading, interference, and bit error rate, and identification of those channels currently available for use.

As the applications in the protocol stacks associated with the slave stations 22, 24, 26, and 32 develop data to be sent over the network, the slave stations generate requests for access to the network and send these channel access request messages to the network control base station 20. Each slave station provides information about the messages that it has in its queue, including the number and for each message, the priority, latency, size, type or application from which it originated, frame size, and minimum required transfer rate. These channel access request messages, which comprise a portion of the multiple individual digital data streams 69, are extracted by the slave station channel request storage block 64, and temporarily stored until needed as channel request data 77 by the adaptive protocol layer tuning module 70. Similar data is derived from the base station applications 72 and provided to the adaptive protocol layer tuning module 70 via the two-way data bus 79. The adaptive protocol layer tuning module 70 computes an optimal set of parameters for each layer of the protocol stack in each slave station of the network, as well as for the protocol stacks associated with the network control base station applications. This optimal set of parameters most appropriately matches the various requests for network resources identified in channel request data 77 and from the base station applications 72 with the current overall capabilities of the network as identified by the network metrics data 75. From these data, the adaptive protocol layer tuning module 70 determines appropriate adjustments to the network characteristics to uniformly distribute the communication load across the network, optimize the quality of service and minimize the network access delay time. Changes may be directed to the network access scheme, access priority, allowed transmission duration for each slave station, and specified transmission rate for each type of message. Changes may also be defined for channel center frequency, bandwidth, waveforms, slot structure, and type of forward error correction to be used. The optimal set of parameters change frequently due to new needs for network access, the overall network communications load, and the quality of signal propagation across the network.

The adaptive protocol layer tuning module 70 includes computing means, such as a general purpose microprocessor or a digital signal processor (DSP), coupled with appropriate software to make the determinations required for network optimization. For example, the tuning module may compare the bit error rate (BER) metrics being produced by the channel metric processor 68 with an a priori rate that defines a minimum acceptable quality of service. If the BER exceeds the limit, then the optimization software will require that the rate of data transmission for that channel be reduced by some amount, such as one half. If the BER improves to a level above a defined threshold, the rate of data transmission is allowed to increase. Other parameters affected by the communication medium are evaluated in a similar manner. To continue the example, each request for access to the network, either from a slave station or from the applications associated with the base station, is tagged with priority, time of receipt, bandwidth required, and any other parameters of concern. A software algorithm in the tuning module determines the latency of each request for network access by comparing the time of arrival of the request with the current time. The algorithm then sorts all requests; first on the basis of priority, then within each priority level on the basis of highest latency, and finally on other parameters such as type of message, etc. Exceptions can be placed on the sort routine to give a higher rating to those requests that have a latency exceeding some preset limit or similar undesirable condition. Those requests requiring a greater bandwidth may be combined in a separate list and allocated to a channel or channels which can supply the higher bandwidth need. The result is a list or lists of all outstanding requests for network access in a prioritized sequence of planned access to the network. The algorithm is continuously repeated as requests are converted to authorizations to access the network and more requests are received. Those skilled in the art will recognize that these software based algorithms can be expanded to include any required complexity for determining optimal access to the network by all users, and thus any such expansions fall within the scope of this invention.

As determinations are made by the adaptive protocol layer tuning module 70 these determinations in the form of slave station configuration commands 83 are sent to the slave station parameter storage block 74 to be stored for subsequent transmission to the slave stations. The tuning module decisions, recent network metrics data 75, and channel request data 77 are also supplied to the state memory 50 by way of data interface 81. State memory 50 retains a history of the recent past condition of the network, network requests and its access by the various slave stations, and supplies this history by way of data interface 81 to the adaptive protocol layer tuning module 70. This history allows the tuning module to more equitably allocate resources to the slave stations and predict the near term future condition of the network.

The slave station parameter storage block 74 stores slave station configuration commands 83 until they are sent to the slave stations. Memory is allocated for each slave station to temporarily store data including station identification, protocol layer parameters, and channel slot assignment, frequency, and bandwidth. This configuration command data 85 for all the slave stations is sequentially read out of memory and sent to the network control channel interleave, coding and waveform modulation block 76 for broadcast by the network control transmitter 78.

The adaptive protocol layer tuning module 70 controls the operation of the network control transmitter 78, the data transmitter 86 and the receiver 58 by way of the tuning module interface 80 and the frequency control block 82. Parameters controlled include the operating frequency of each of these blocks, the encoding and interleaving of data packets into their appropriate slots, and the type of modulation used by both the network control transmitter 78 and the data transmitter 86.

Information input 87 from the operator of the base station is supplied to the various network control base station applications 72. The applications convert the input information into the characteristic digital format for that application. Associated with each application is a protocol layer stack 88 which further processes the information into a form appropriate for transmission over the network. The preferred embodiment of the present invention provides an interface 90 to each layer of the protocol layer stack 88 which is coupled to the adaptive protocol layer tuning module 70 by the two-way data bus 79. Interface 90 comprises the minimum physical interconnections required to gain access to the appropriate points in the circuitry which embodies the various layers of the protocol stack, a coupling to an input/output port of the adaptive protocol layer tuning module 70, and the software required to accomplish the required interaction with the protocol layers. The interface 90 allows the tuning module to define the parameters of each layer in the protocol stack to optimize the transmission of the application's data over the network. This interface 90 provides control of each application's rate of message generation, type of modulation and type of forward error correction to be used, as well as what part of the message is to be sent during each access to the network. The application can then adjust its message characteristics and rate of message generation to stay within the allowed limits.

In accordance with the network access information supplied to the applications by the adaptive protocol layer tuning module 70, the various base station applications 72 output their data to be transmitted via line 89 to the data interleave, coding and waveform modulator 84 for broadcast by the data transmitter 86.

Figure 6:
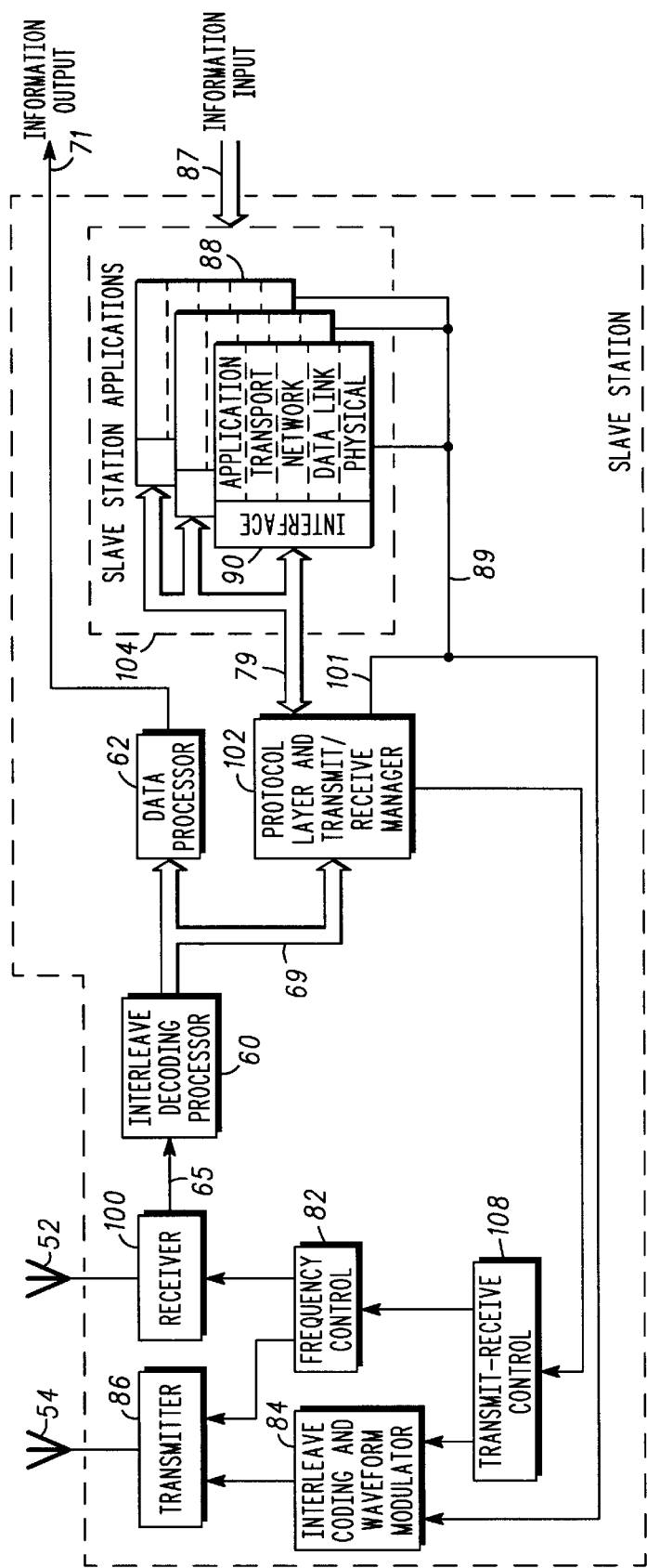
FIG. 6 provides a block diagram of a typical slave station.

FIG. 6 is a block diagram of a slave station 22, which is representative of any of the slave stations that comprise a part of the wireless communication network depicted in FIG. 4, in accordance with the preferred embodiment of the present invention. Many of the blocks in the slave station are identical to blocks that perform the same functions in the network control base station 20, and thus are identified by the same reference numbers as those found in FIG. 5.

Antennas 52 and 54 provide the coupling of the slave station to the fading medium 40, and thus to the network control base station 20 and other slave stations. Those skilled in the art will recognize that alternate antenna arrangements may be used in place of antennas 52 and 54 and thus fall within the scope of this invention. The signals arriving at the slave station 22 location are collected by antenna 52 and routed to receiver 100 which is identical to the receiver 58 in FIG. 5 with the exception that it does not have an broadband output. The interleave decoding processor 60 generates the individual digital data streams 69 that comprise received versions of the messages which were transmitted by both the network control base station 20 and those slave stations within communication range of slave station 22. The data processor 62 performs the same function as that carried out in the base station with the result that the operator of slave station 22 is provided with those messages intended for this slave station as their final destination. The information output 71 may comprise audio, video, text or digital data.

Information input 87 is supplied by the slave station operator to the various slave station applications 104 which are similar to those identified as block 72 in network control base station 20. The applications, their associated protocol layer stacks 88, and interface 90 operate in the same manner as that described for the network control base station 20. When an application is invoked by the operator of the slave station, the application sends a request for network resources to transmit the message being generated to its intended destination through interface 90 and the two-way data bus 79 to the protocol layer and transmit-receive manager 102. The manager formats a channel access request message 101 and sends it to the interleave coding and waveform modulator 84 for transmission by the transmitter 86 to the network control base station 20. The protocol layer and transmit-receive manager 102 also controls operation of the transmitter 86, the receiver 100, the interleave coding and waveform modulator 84, and frequency control 82 by way of the transmit-receive control 108 in a manner similar to the like-function blocks in the network control base station 20.

As a part of the receive process, the multiple individual digital data streams 69 out of the interleave decoding processor 60 are supplied to the protocol layer and transmit-receive manager 102. Those control messages sent by the network control base station 20 to this slave station 22 are extracted from the data stream, further processed and formatted as necessary, and supplied to the protocol layer stack interface 90 and thus to each application that had requested access to network resources. The interface informs each application about its network access priority and allowed transmission parameters; including rate of message generation, channel center frequency and bandwidth, slot structure, type of modulation and type of forward error correction to be used, as well as the part of the message to be sent during each access to the network. The application can then adjust its message characteristics and rate of message generation to stay within the allowed limits.

In accordance with the network access information supplied to the applications by the protocol layer and transmit-receive manager 102, the various slave station applications 104 output their data to be transmitted via line 89 to the data interleave, coding and waveform modulator 84 for broadcast by transmitter 86.

Figure 7:
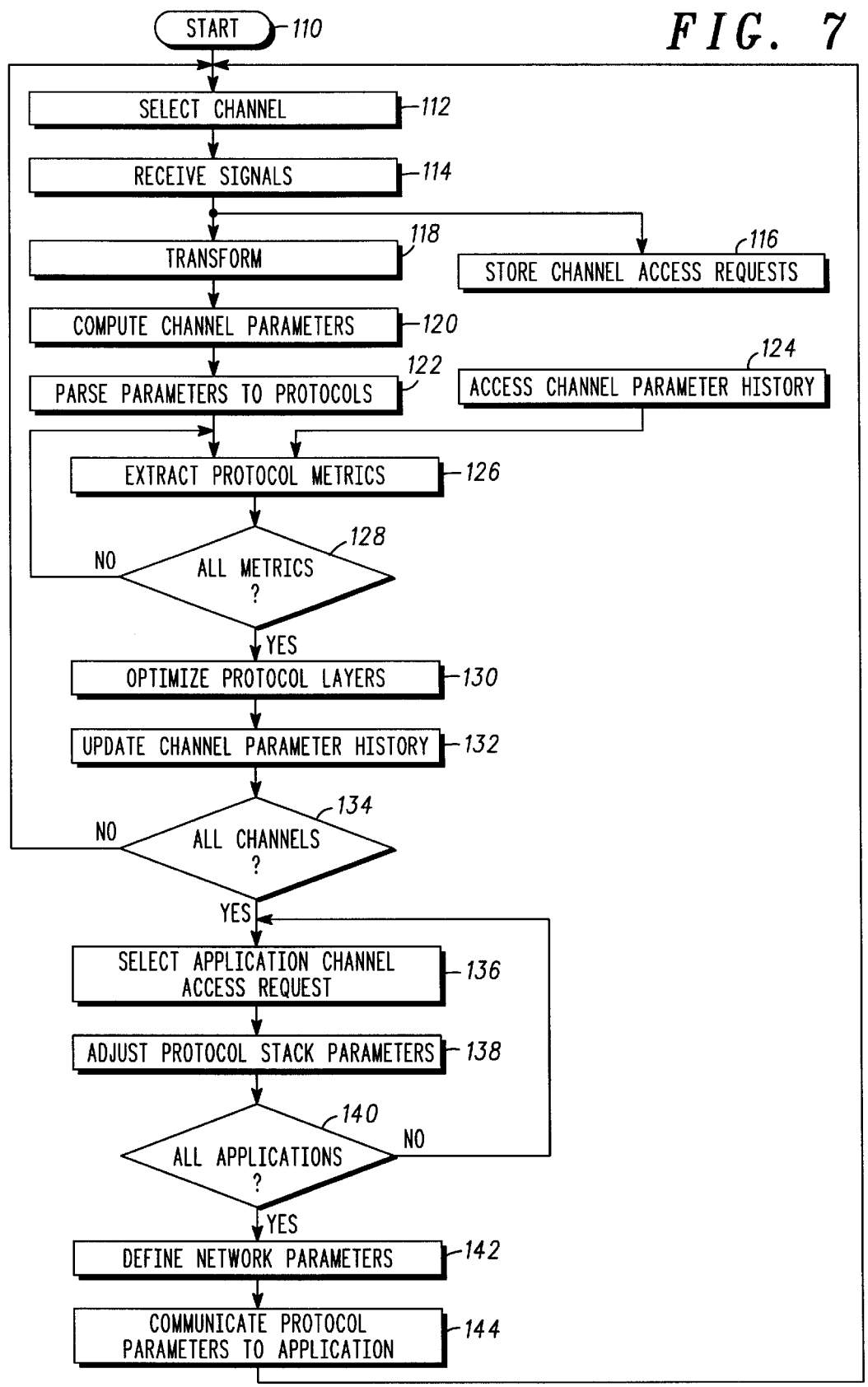
FIG. 7 is a flow chart of the network control base station process for statistically evaluating the characteristics of the communication medium and messages to allow continuous load optimization of the network.

FIG. 7 is a flow chart illustration of the process carried out in the network control base station 20 to evaluate the propagation characteristics of the network, the message traffic flow over the network, and the characteristics of messages generated by applications associated with both the slave stations and the base station; and as a result of the evaluation, command changes to various parameters of each application's protocol stack to optimize the use of the network resources and minimize message latency. This optimization or tuning process begins with start box 110 and thereafter continues in an endless loop manner. One channel out of a plurality of channels used by the network is chosen in the channel select box 112. The channels are chosen in sequence; when the highest numbered channel has been processed, then processing returns to the first channel. The receive signal box 114 represents the receiver 58 and interleave decoding processor 60 activities of receiving the signals emitted by the slave stations, demodulating these signals, de-interleaving and de-coding as required to separate the information content sent by each slave station. The receive signal function 114 also represents the extraction of broadband samples of the signals within the channel for further analysis. Box 116 represents the storage of channel access requests to transmit messages generated by the applications located within the various slave stations.

Transform box 118 identifies the processes of conducting fast Fourier transforms or similar spectrum analyses to facilitate evaluation of the current communications capability of the channel. Compute channel parameters box 120 includes the activities of calculating signal to noise ratios, determining bit error rates, evaluating the incidence of fading, determining the characteristics of interference, whether wide band or narrow band, bauded or un-bauded, and identifying the current communication load on the channel. This information is then allocated to the various protocol stack layers in the parse parameters to protocols box 122.

The channel metric processor 68 stores in its internal memory recently received channel parameter data that defines the overall attributes of the channel in the recent past. This data is acquired from the access channel parameter history box 124 and supplied as one input to the extract protocol metrics box 126. The other input to box 126 is the current information about the various layers in the protocol from box 122. These data are used to determine metrics or statistical information about past, present and the future trend condition of the channel, including signal to noise ratio, path loss, fading, interference, bit error rate, bandwidth, slot structure, access delay, and whether the channel is currently available for use. A check is made in box 128 to assure that all metrics have been computed; if not, control is returned to box 126 to allow the process to repeat for the next metric.

When all the metrics have been determined for the channel under consideration, the optimize protocol layers box 130 uses the metric data to optimize the specifications for each layer of the protocol stack that defines the channel under consideration. The new information about the current condition of the channel and the new definition of the protocol stack are added to the recently received channel parameter data memory while the oldest data is discarded in box 132.

Box 134 makes a determination whether there are additional channels assigned to the network that must be evaluated. If all channels have not been analyzed, control is returned to box 112 where the next channel in sequence is selected and the process defined by boxes 112 through 132 is repeated.

After optimizing the protocol layers for all channels, the process of assigning channel assets is begun to meet the needs for network access by the various slave stations and their applications. In box 136, selection of an application, that had been stored in the store channel access requests box 116, is made based on assigned priority and latency of the request. A portion of the available channel resources is assigned to that application in the adjust protocol stack parameters box 138. Assigning these resources includes defining parameters for the various layers of the protocol stack for that particular application.

Box 140 makes a determination whether all applications that are requesting use of the network have been considered. If additional requests for service exist, control is returned to box 136 where the next application is selected.

When all the current requests for use of the network have been processed, control is transferred to box 142 where all network parameters and application assignments are combined into a network configuration message. Box 144 identifies the process of communicating the network configuration information and application assignments to all the slave stations and to the applications associated with the network control base station. After this communication is completed, control is returned to box 112 were the first channel is selected and the process repeats.

Figure 8:
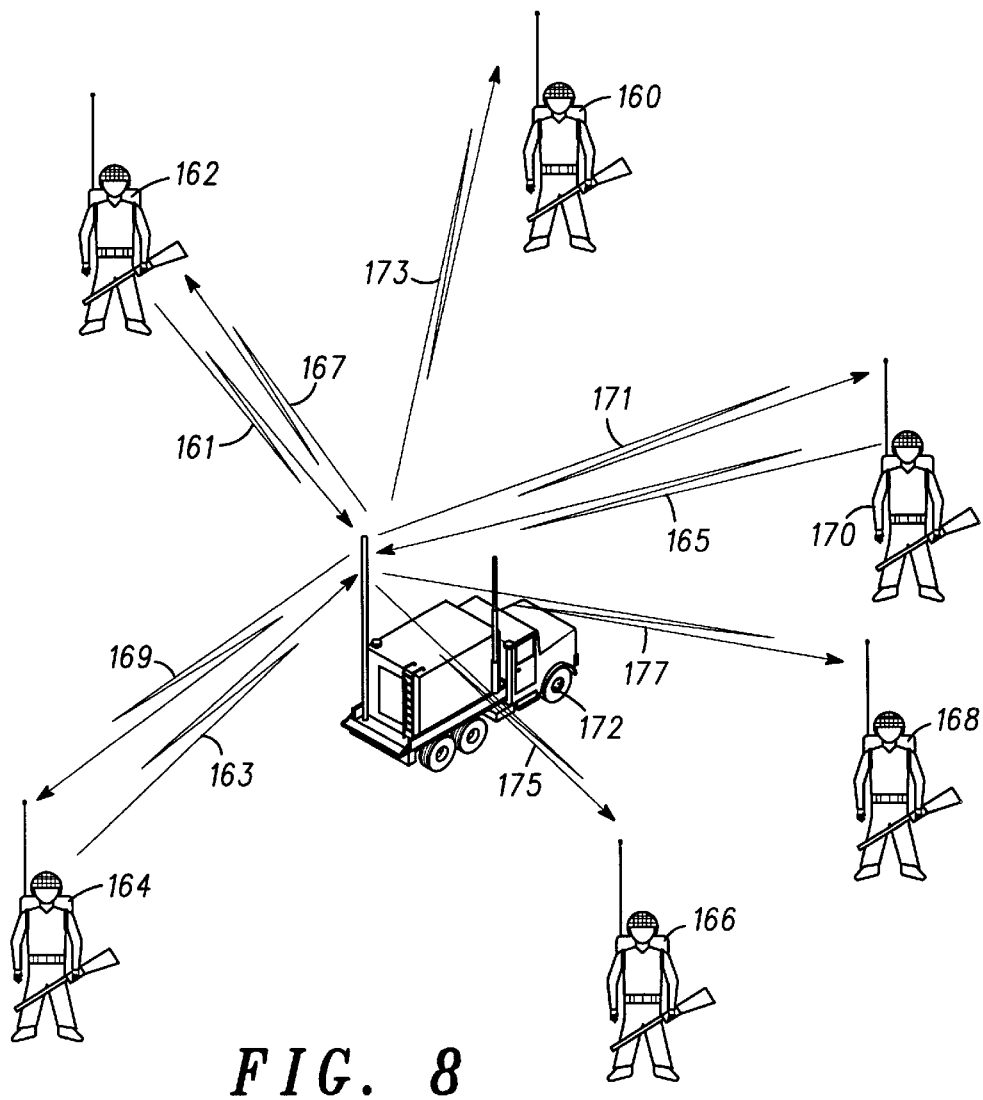
FIG. 8 depicts a wireless communications system comprising a base station and a plurality of manpack radio nodes according to the first alternative embodiment of the present invention.

An alternative embodiment of the present invention is presented in FIG. 8 which illustrates a multiple node network comprising a plurality of manpack radio nodes 160, 162, 164, 166, 168, 170 and a base station 172. Messages 161, 163, and 165 are being transmitted from the manpack radio nodes to the base station 172, while the base station 172 broadcasts messages 167, 169, 171, 173, 175 and 177 to all manpack radio nodes. The manpack nodes serve as data sources, while the base station node, or "headquarters", serves as the destination for all network traffic, but does not control the operations of the other nodes. The architecture of each node is similar to that of the slave stations of the preferred embodiment of the present invention which is illustrated in FIG. 6.

Figure 9:
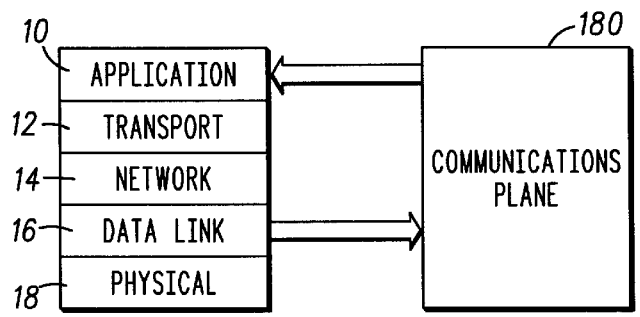
FIG. 9 shows the protocol feedback structure of the first alternative embodiment of the present invention.

Each node of the alternate embodiment has a protocol stack with an application layer 10, transport layer 12, network layer 14, data link layer 16 and physical layer 18 as illustrated in FIG. 9. For each application, the datalink layer 16 and the application layer 10 are coupled to a communications plane 180 by simple modular interfaces. Other layers may also be invoked by the communications plane 180 depending on the particular structure of the network. The communications plane 180 can provide many of the functions of the protocol layer and transmit-receive manager 102 and interface 90 of FIG. 6.

The communications plane 180 includes computational means, such as a microprocessor or DSP, and associated software to perform needed information transfer, signal processing and control functions. Various levels of software complexity can be installed in the memory of the processor depending upon the desired capability of the manpack node. For example, the communications plane may act purely as a network statistic database which can be accessed by the datalink and application layers, with little computation occurring within the communications plane. Feedback can be provided from the physical layer to one or more layers above to optimize bandwidth usage for the current link conditions. In this example, the BER experienced in the channel may be used to adjust the data rate of outgoing messages based on some a priori minimum acceptable quality of service. Thus, if 3 dB of additional gain is required to meet a required speech quality level, then the communications plane bypasses the intervening layers to direct the application layer to adjust the data generation rate down by one-half. Or, in some communication modes an adjustment of the processing gain via hop bandwidth or direct sequence spreading could also be used at the physical layer to achieve the required improvement in BER.

By the addition of software, and possibly some additional required hardware, the communications plane can perform signal processing functions, such as filtering and QOS calculations. With the additional computational capabilities, the average channel end to end (ETE) delay can be determined by the communications plane by monitoring all the other nodes, collecting all the channel access delay information, and computing a mean of the data. Given the average ETE delay, each of the applications at the application layer can adjust its message generation rate to prevent unrestrained growth in the average delay experienced by the network. The communications plane can also use lowpass filtering functions to produce the average ETE delay figure. Linear prediction functions can also be used to estimate the ETE delay at some time in the future and then pass on this information to the applications of the application layer. With computational capabilities similar to the adaptive protocol layer tuning module 70 of FIG. 5 installed in the communications plane, nonlinear signal processing methods can be used to compute transform domain representations and subsequently measure channel quality and co-site or jammer interference levels. The resulting data can then be supplied directly to the application layer.

The present invention has been described above with reference to a particular preferred embodiment and a first alternate embodiment to facilitate teaching the invention. Those skilled in the art will recognize that many other alternative embodiments, modifications and variations are apparent in light of the foregoing description. Accordingly, the invention is intended to embrace all such alternatives, modifications, and variations as fall within the spirit and broad scope of the appended claims.

We claim:

1. An apparatus for use in a wireless communication network having a plurality of slave stations and a network control base station, said network control base station comprising:

a transmitter;

a receiver;

a channel metric processor, coupled to said receiver, to evaluate communication medium characteristics;

a storage device for storing message transmission requests from said plurality of slave stations;

an adaptive protocol layer tuning module, responsive to said channel metric processor and said storage device and coupled to said transmitter, to optimize a load on said wireless communication network by evaluating properties of messages to be sent and by controlling a rate and a sequence of message generation by both said network control base station and said plurality of slave stations;

at least one layered protocol stack having a plurality of layers; and an interface coupled between said adaptive protocol layer tuning module and said at least one layered protocol stack for enabling said adaptive protocol layer tuning module to control parameters of at least one layer of said at least one layered protocol stack.

2. An apparatus as claimed in claim 1, wherein said network control base station further includes a channel parameter extractor coupled between said receiver and said channel metric processor to evaluate certain parameters of received signals.

3. An apparatus as claimed in claim 1, wherein said network control base station further includes a state memory coupled to said adaptive protocol layer tuning module for storing a history of parameters of received signals, said message transmission requests, and access to the network by said slave stations and by said network control base station.

4. An apparatus as claimed in claim 1, wherein said interface enables each layer of said at least one layered protocol stack to communicate with any other layer of said at least one layered protocol stack and wherein said interface enables said adaptive protocol layer tuning module to control parameters of each layer of said at least one layered protocol stack.

5. An apparatus as claimed in claim 1, wherein said interface collects data from each layer of said at least one layered protocol stack, and wherein said adaptive protocol layer tuning module formats said data into message transmission requests, and stores and retrieves when needed, said message transmission requests originating in applications coupled to said network control base station.

6. An apparatus as claimed in claim 1, wherein said network control base station includes:

an interleave decoding processor coupled to said receiver; and wherein said storage device is coupled to said interleave decoding processor for receiving said message transmission requests from said plurality of slave stations, and for storing and retrieving said message transmission requests from said slave stations when needed.

7. An apparatus as claimed in claim 1, wherein said adaptive protocol layer tuning module compares current and near future communication capabilities of said wireless communication network with all said message transmission requests, and generates network access assignments that equalize network loading and minimize message latency.

8. An apparatus as claimed in claim 7, wherein said network control base station includes:

a slave station parameter storage module to store said network access assignments for said plurality of slave stations; and wherein said transmitter communicates said network access assignments to all of said plurality of slave stations.

9. An apparatus as claimed in claim 7, wherein said adaptive protocol layer tuning module and said interface communicates said network access assignments to each application coupled to said network control base station.

10. An apparatus for use in a wireless communication network having a plurality of slave stations and a network control base station, wherein each said slave station includes:

at least one application;

at least one layered protocol stack coupled to said at least one application, said at least one layered protocol stack having a plurality of layers;

a receiver for receiving messages and network access assignments from said network control base station;

a transmitter for transmitting message transmission requests and transmitting messages over said wireless communication network;

a protocol layer and transmit receive manager module coupled to said at least one layered protocol stack, said receiver, and said transmitter for controlling the overall operation of said slave station; and an interface coupled between said protocol layer and transmit receive manager module and at least one of said plurality of layers for enabling said protocol layer and transmit receive manager module to control parameters of said at least one of said plurality of layers.

11. An apparatus as claimed in claim 10, wherein said interface is coupled between said protocol layer and transmit receive manager module and each one of said plurality of layers and wherein the interface enables each one of said plurality of layers to communicate with any other one of said plurality of layers as well as enables said protocol layer and transmit receive manager module to control parameters of each one of said plurality of layers.

12. An apparatus as claimed in claim 11, wherein said interface collects data from each one of said plurality of layers, and wherein said protocol layer and transmit receive manager module formats said data into said message transmission requests originating in said at least one application.

13. An apparatus as claimed in claim 10, wherein said slave station includes an interleave coding and waveform modulator, coupled to said protocol layer and transmit receive manager module and to said transmitter, to send said message transmission requests to said network control base station.

14. An apparatus as claimed in claim 10, wherein said slave station includes:

an interleave decoding processor coupled to said receiver; and wherein said protocol layer and transmit receive manager module is coupled to said interleave decoding processor and to said interface for receiving said network access assignments from said network control base station and for supplying said network access assignments to each one of said plurality of layers of said at least one layered protocol stack.

15. An apparatus as claimed in claim 10, wherein said slave station includes:

a slave station applications module including said at least one application and said at least one layered protocol stack;

said protocol layer and transmit receive manager module for controlling transmission of said transmitted messages in accordance with said network access assignments; and an interleave coding and waveform modulator coupled to said protocol layer and transmit receive manager module and to said slave station applications module.

16. A method for optimizing a load on a wireless communication network, the wireless communication, network including a plurality of slave stations and a network control base station, the method comprising the steps of:

receiving signals from said plurality of slave stations;

evaluating parameters of said received signals;

adjusting characteristics of said wireless communication network based upon said evaluated parameters thereby generating an optimal set of parameters for said wireless communication network to distribute a communication load across said wireless communication network, optimize a quality of service of said wireless communication network and minimize access delay time to said wireless communication network; and supplying said optimal set of parameters to at least one protocol stack layer associated with applications of said network control base station.

17. The method of claim 16 further including the step of storing said optimal set of parameters in memory for transmission to said plurality of slave stations.

18. The method of claim 16 wherein said step of adjusting characteristics of said wireless communication network includes adjusting a network access time.

19. The method of claim 16 wherein said step of adjusting characteristics of said wireless communication network includes adjusting an access priority.

20. The method of claim 16 wherein said step of adjusting characteristics of said wireless communication network includes adjusting an allowed transmission rate.

* * * * *